United States Patent
Choe et al.

(10) Patent No.: US 10,431,999 B2
(45) Date of Patent: Oct. 1, 2019

(54) CHARGING ASSEMBLY OF ELECTRONIC FRAME AND CHARGING METHOD OF ELECTRONIC FRAME

(71) Applicant: LG ELECTRONICS INC., Seoul (KR)

(72) Inventors: Dami Choe, Seoul (KR); Saehun Jang, Seoul (KR); Junhee Yeo, Seoul (KR); Boram Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/779,352

(22) PCT Filed: Mar. 8, 2016

(86) PCT No.: PCT/KR2016/002299
§ 371 (c)(1),
(2) Date: May 25, 2018

(87) PCT Pub. No.: WO2017/094972
PCT Pub. Date: Jun. 8, 2017

(65) Prior Publication Data
US 2018/0309309 A1    Oct. 25, 2018

(30) Foreign Application Priority Data
Dec. 2, 2015    (KR) .................. 10-2015-0170895

(51) Int. Cl.
*G06F 3/038*    (2013.01)
*G09G 5/00*    (2006.01)
(Continued)

(52) U.S. Cl.
CPC .......... *H02J 7/0042* (2013.01); *G06F 1/1635* (2013.01); *G06F 1/1656* (2013.01);
(Continued)

(58) Field of Classification Search
None
See application file for complete search history.

(56) References Cited

U.S. PATENT DOCUMENTS

| | | | |
|---|---|---|---|
| 8,237,696 B2 * | 8/2012 | Chung | G09G 3/20 345/207 |
| 2008/0100632 A1 * | 5/2008 | Peng | H04N 1/00 345/530 |

(Continued)

FOREIGN PATENT DOCUMENTS

| | | | | |
|---|---|---|---|---|
| JP | 2010-233125 | 10/2010 | | |
| JP | 2010233125 A * | 10/2010 | .......... | H04M 1/7253 |

(Continued)

OTHER PUBLICATIONS

Definition of electrode, 2019, Google.com, p. 1 (Year: 2019).*
(Continued)

*Primary Examiner* — Lunyi Lao
*Assistant Examiner* — Kirk W Hermann
(74) *Attorney, Agent, or Firm* — Ked & Associates, LLP

(57) ABSTRACT

The present invention relates to a charging assembly for an electronic frame and a charging method for an electronic frame. The charging assembly of an electronic frame comprises: an electronic frame having a battery and displaying time information; a take-up reel provided on a rear surface of the electronic frame for winding or unwinding a charge cable; a weight which is connected to the take-up reel by the charge cable to be raised or lowered; and a charger arranged apart from the electronic frame, for charging the battery, wherein the weight is lowered at the time of charging to be electrically connected to the charger.

19 Claims, 27 Drawing Sheets

(51) Int. Cl.
*H02J 7/00* (2006.01)
*G06F 1/16* (2006.01)
*G06F 1/26* (2006.01)
*H02G 11/02* (2006.01)

(52) U.S. Cl.
CPC .............. *G06F 1/26* (2013.01); *G09G 5/003* (2013.01); *H02G 11/02* (2013.01); *H02J 7/00* (2013.01); *H02J 7/0013* (2013.01); *G06F 1/1626* (2013.01); *G06F 1/1637* (2013.01); *G09G 2300/026* (2013.01); *G09G 2330/021* (2013.01); *G09G 2380/16* (2013.01)

(56) References Cited

U.S. PATENT DOCUMENTS

2010/0248780 A1* 9/2010 Tanaka ................ H04M 1/7253
455/556.1
2018/0202227 A1* 7/2018 Lagarde ................... E06B 9/32

FOREIGN PATENT DOCUMENTS

| KR | 10-2000-0066728 | 11/2000 |
| KR | 10-0972383 | 7/2010 |
| KR | 10-1093522 | 12/2011 |
| KR | 101093522 B1 * | 12/2011 |
| KR | 10-2015-0086967 | 7/2015 |

OTHER PUBLICATIONS

International Search Report (with English Translation) and Written Opinion dated Aug. 24, 2016 issued in Application No. PCT/KR2016/002299.

* cited by examiner

[DIGITAL FRAME]

CHARGING ASSEMBLY OF ELECTRONIC FRAME AND CHARGING METHOD OF ELECTRONIC FRAME

CROSS-REFERENCE TO RELATED PATENT APPLICATIONS

This application is a U.S. National Stage Application under 35 U.S.C. § 371 of PCT Application No. PCT/KR2016/002299, filed Mar. 8, 2016, which claims priority to Korean Patent Application No. 10-2015-0170895, filed Dec. 2, 2015, whose entire disclosures are hereby incorporated by reference.

TECHNICAL FIELD

The present invention relates to an apparatus for charging an electronic frame and a charging method thereof.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

On the other hand, when a frame is put on a wall or the like, there is a need to change the frame to change an image. Accordingly, electronic frames capable of easily changing output images and methods for controlling the electronic frames are being discussed.

Such an electronic frame must be continuously supplied with power in a charging manner, and development of an apparatus and method for charging is required.

DISCLOSURE OF THE INVENTION

The present invention is directed to solving the aforementioned problems and other drawbacks. Another aspect of the present invention is to provide an apparatus for charging an electronic frame and a method for charging the electronic frame.

According to an aspect of the present invention, there is provided a charging assembly, including an electronic frame having a battery and displaying visual information, a take-up reel provided on a rear surface of the electronic frame to wind or unwind a charge cable, a weight connected to the take-up reel by the charge cable to be raised and lowered, and a charger arranged to be spaced apart from the electronic frame and charging the battery, wherein the weight is lowered at the time of charging to be electrically connected to the charger.

According to an aspect of the present invention, the electronic frame may include a display unit to output the visual information, a support frame supporting the display unit, a motor provided on the support frame to rotate the take-up reel, and a main circuit board to control the motor.

According to an aspect of the present invention, the weight may be formed to be streamlined downward, and the charger may be provided with an insertion groove formed to correspond to the shape of the weight. The insertion groove may be provided with an inclined guide formed at an inlet side thereof to be inclined downward to guide the weight.

According to an aspect of the present invention, the weight may be provided with at least one electrode portion, and the charger may be provided with a contact terminal protruding into the insertion groove, having elasticity and selectively brought into contact with the electrode portion.

According to an aspect of the present invention, the charger may be provided with a cover having a hinge on one side thereof to be rotatable centering on the hinge so as to selectively cover a top surface of the charger.

According to an aspect of the present invention, a front end portion of the weight may be formed in a conical shape.

According to an aspect of the present invention, the weight may have a disc shape and the charger may be mounted on a side wall. The weight may be coupled to the charger by magnetic force when charging the battery.

According to an aspect of the present invention, the weight may be made of a metal material, and the charger may be provided with a magnetic member on one side of the insertion groove to guide the insertion of the weight.

According to an aspect of the present invention, a rail may be formed from a power supply unit for supplying power to the charger to a point below each electronic frame when the electronic frame is provided in plurality, and the charger may charge the electronic frames by moving along the rail.

According to an aspect of the present invention, each of the electronic frame and the charger may be provided with a wireless transceiver such that the charger detects a position of the electronic frame.

According to one aspect of the present invention, when the electronic frame is provided in plurality, chargers corresponding to the respective electronic frames may be provided below the electronic frames, and the chargers may be connected by one power cable.

According to an aspect of the present invention, when the electronic frame is provided in plurality, one charger may be provided below the plurality of electronic frames, and the charger and the plurality of electronic frames may be connected by respective charge cables.

According to an aspect of the present invention, when the electronic frame is provided in plurality, the plurality of electronic frames may be connected by connection cables, and one of the plurality of electronic frames may be connected to the charger by a charge cable.

According to an aspect of the present invention, the charger may be connected to a power supply unit by a power cable, and the charger and the power supply unit may be selectively connected or disconnected by power supply connection portions.

According to an aspect of the present invention, there is provided a method for charging an electronic frame including an electronic frame having a battery, and a charger arranged to be spaced apart from the electronic frame and charging the electronic frame, wherein the electronic frame is provided with an electrode portion selectively coupled to the charger, the method including (a) determining whether a capacity of the battery is less than a preset value, (b)

detecting a movement of an object around the electronic frame, and (c) coupling the electrode portion provided on the electronic frame to the charger when the movement of the object around the electronic frame is not detected.

According to an aspect of the present invention, the step (a) may further include determining through an illumination sensor whether brightness is equal to or lower than preset brightness.

According to an aspect of the present invention, the step (b) may include detecting a user through a motion detection sensor.

According to an aspect of the present invention, the step (b) may include detecting absence of a user by interworking with an Internet of Things (IoT) device.

According to an aspect of the present invention, the step (c) may include detecting whether or not the electrode portion has been mounted to a correct position of the charger, and transmitting an error message to the user through a display when the electrode portion has not been mounted to the correct position.

According to an aspect of the present invention, there is provided a charging assembly, including a charger installed on a ceiling and having an electrode portion, and an electronic frame disposed below the charger, displaying visual information through a display, and provided with a contact terminal selectively brought into contact with the electrode portion, wherein the electrode portion is lowered by a charge cable to be electrically connected to the contact terminal when the electronic frame is charged.

ADVANTAGEOUS EFFECT

Hereinafter, effects of an electronic frame and a charging method thereof according to the present invention will be described.

According to at least one of embodiments of the present invention, an electronic frame can be automatically charged.

Further, according to at least one of embodiments of the present invention, a plurality of electronic frames can be charged simultaneously or independently by one charger or a plurality of chargers.

MODES FOR CARRYING OUT THE PREFERRED EMBODIMENTS

Figure 1A:
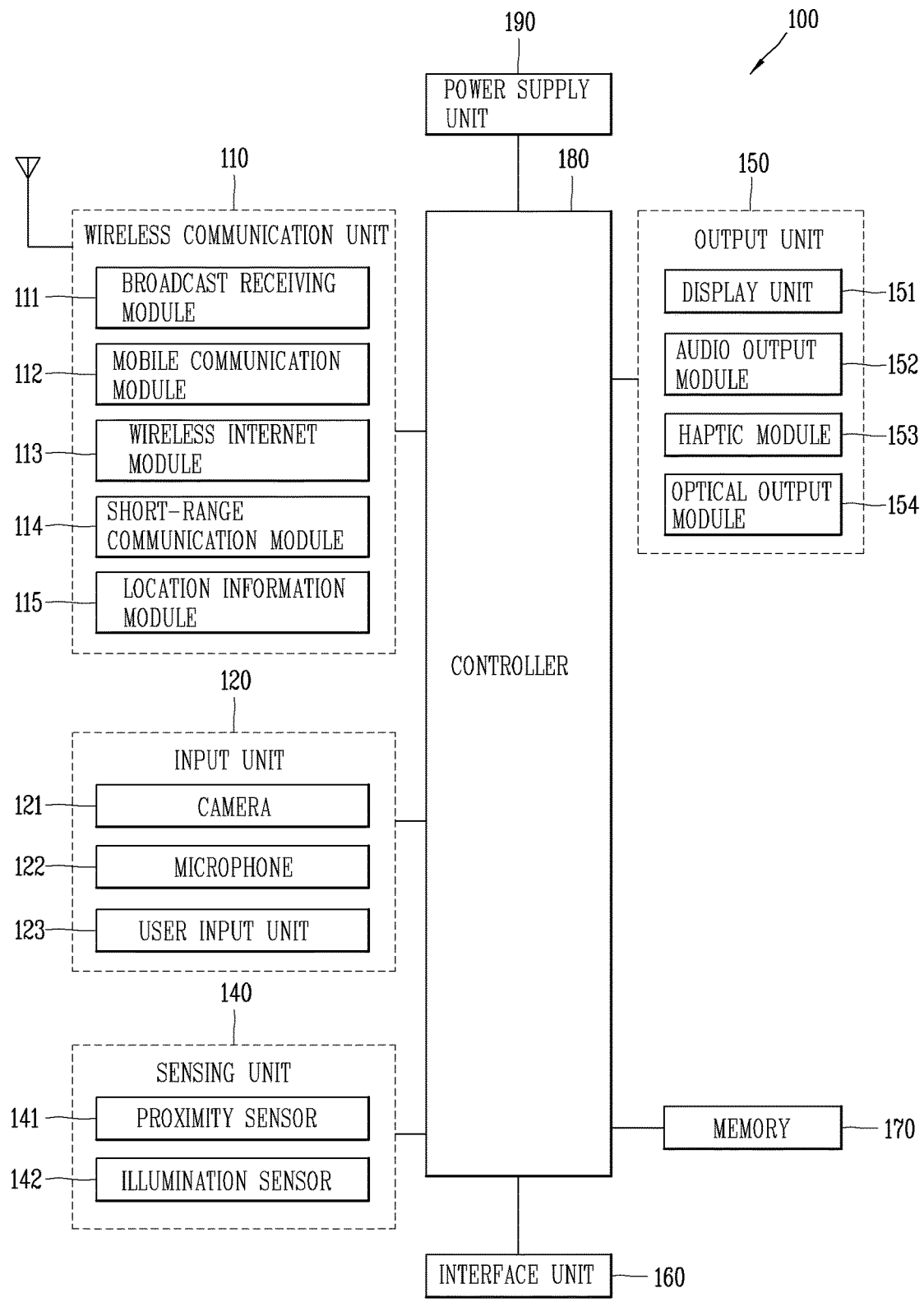
FIG. 1A is a block diagram of a mobile terminal in accordance with one exemplary embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
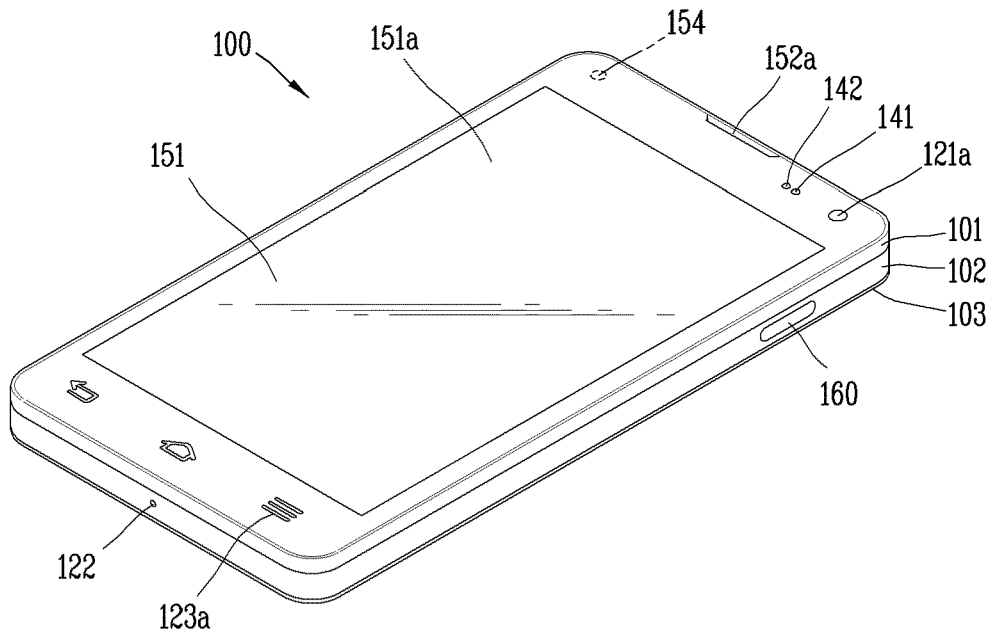
FIGS. 1B and 1C are conceptual views illustrating one example of a mobile terminal according to the present invention, viewed from different directions.
Figure 1C:
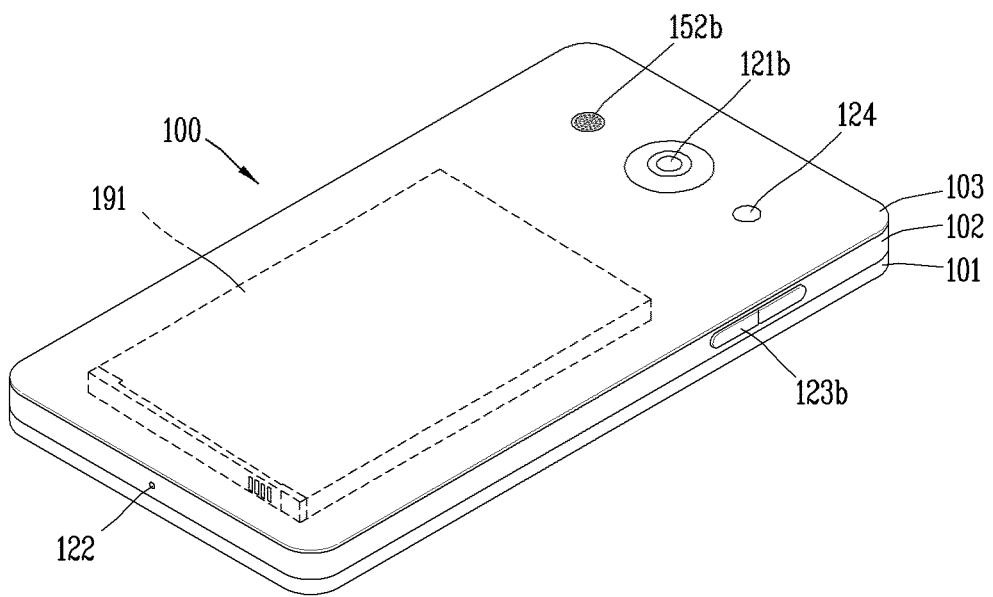

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Next, the input unit 120 is for inputting image information (or signal), audio information (or signal), data, or information input from a user. For inputting image information, the mobile terminal 100 may be provided with a plurality of cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein on the mobile terminal 100 according to the present invention.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia playback sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a battery 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Figure 2:
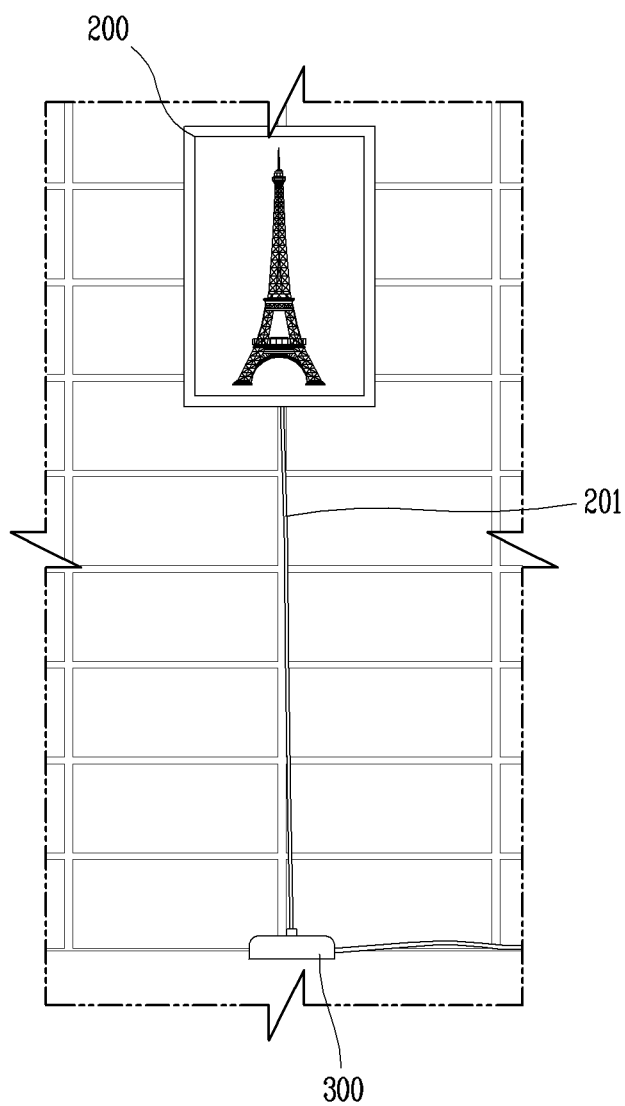
FIG. 2 is a view illustrating an example of utilizing an electronic frame according to one embodiment of the present invention.

FIG. 2 is a view illustrating an example of using an electronic frame 200 according to one embodiment of the present invention. The electronic frame (or a digital frame) 200 is an image display device to which visual information can be output, and an image output by the mobile terminal 100 may be set. In one embodiment, the electronic frame 200 may be implemented as a display frame or a digital frame that is disposed on a wall surface or the like to output an image.

Figure 22:
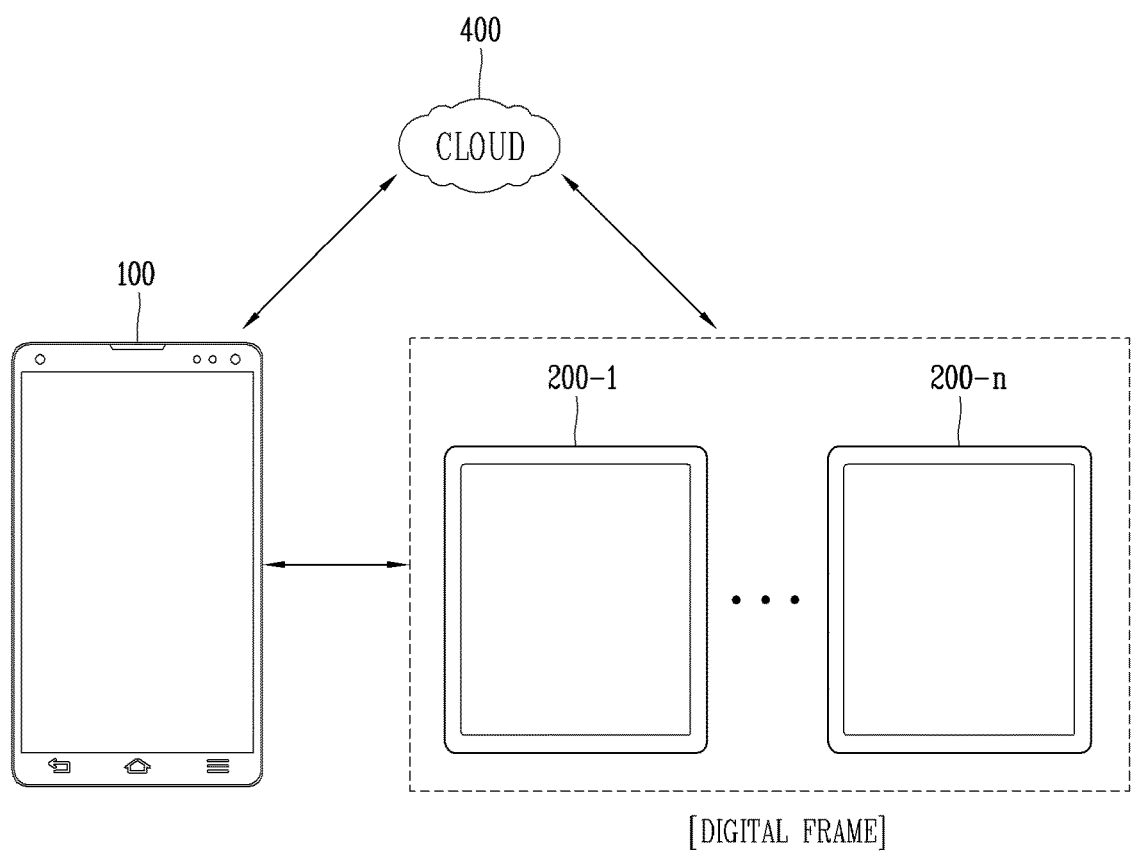
FIG. 22 is a view illustrating a system for providing an electronic frame service according to one embodiment of the present invention.

FIG. 22 is a conceptual view of a system for providing an electronic frame service according to one embodiment of the present invention. Hereinafter, an image output service provided by the mobile terminal 100 according to the present invention will be described with reference to FIG. 22. The system for providing the service may include a mobile terminal 100, a plurality of electronic frames 200-1, 200-2, 200-3, . . . , 200-n, and a cloud server 400.

In the following description, an arbitrary electronic frame among the plurality of electronic frames 200-1, 200-2, 200-3, . . . 200-n will be represented as an 'electronic frame 200'.

First, an embodiment of initial setup for providing the service will be described. The electronic frame 200-1 may transmit its information to the mobile terminal 100 through local networking such as BLE or WIFI. Then, the mobile terminal 100 may transmit the received information related to the electronic frame 200-1 to the cloud server 400.

At this time, the information related to the electronic frame 200-1 may include ID, a local network IP, a model number, sensor information such as an illumination sensor or a gyro sensor, a battery state, and the like.

Accordingly, the cloud server 400 matches information related to the registered terminal 100 with information related to the plurality of electronic frames 200-1, 200-2, 200-3, . . . , 200-n. As a result, the setup between the electronic frame 200 and the cloud server 400 is made.

In another embodiment, the electronic frame 200 may be controlled by a control signal of the terminal 100 (Local control), a control signal through a cloud server 400 (Control via cloud), and a control signal generated by itself (Self-Control).

Specifically, when the local control with the terminal 100 is a default control but the local control is impossible to be performed, the electronic frame 200 performs an operation through a network of the terminal 100. The electronic frame 200 may also be remotely controlled through the cloud control. In other words, priorities of the controls may be in an up-to-date order, but in case of simultaneous operation, the local control, the control via cloud, and the self-control may be sequentially performed.

As a related example, when a battery level (or a battery capacity) is below a predetermined level (or value), self-charging (self-control) may be performed even without a separate control command of a user. Further, when charging is completed, the battery level of the battery may be returned to its original state. On the other hand, the user may charge the battery at any time (local control) and also register a charging schedule in advance.

In another embodiment, the user may change an image of the electronic frame 200 through the terminal 100 or a web service. Specifically, photographs (images) stored in a photo album of the terminal 100 or captured photographs (images) may be changed through a local network. In addition, the image may be changed by an application for providing the service via the cloud server 400.

As another embodiment, even though the cloud is disconnected, an alarm message is not output to the mobile terminal 100 immediately. In detail, in a state where the cloud network is disconnected, a notification may be provided to the terminal 100 when an application is executed by the terminal 100 or when it is difficult to change the image at a time point to change the image.

In another embodiment, when images are exchanged among the plurality of electronic frames 200-1, 200-2, 200-3, . . . , 200-n, or when images in the respective electronic frames are to be set, the plurality of electronic frames may receive the images through a local network without passing through the cloud 400. That is, the plurality of electronic frames 200-1, 200-2, 200-3, . . . 200-n can directly exchange signals with one another.

On the other hand, the controller 180 may output a plurality of objects corresponding to the plurality of electronic frames 200-1, 200-2, 200-3, . . . , 200-n, respectively, on the basis of at least one of relative position information and size information related to the plurality of electronic frames 200-1, 200-2, 200-3, . . . , 200-n, respectively.

In another embodiment, the controller 180 may output a plurality of objects corresponding to the respective electronic frames 200-1, 200-2, 200-3, . . . , 200-n, based on at least one of captured images of the respective electronic frames 200-1, 200-2, 200-3, . . . 200-n, intensities of signals received respectively from the plurality of electronic frames 200-1, 200-2, 200-3, . . . 200-n, intensities of signals exchanged by the plurality of electronic frames 200-1, 200-2, 200-3, . . . , 200-n.

As described above, the electronic frame 200 and the mobile terminal 100 may exchange data with an external server (e.g., the cloud server).

Since the electronic frame 200 is a type of electronic device, the battery 220 disposed in the electronic frame 200 must be continuously charged for continuous use. That is, the battery 220 of the electronic frame 200 is repeatedly charged and discharged, and a charger (cradle) 300 which is disposed near the electronic frame 200 is required for charging the battery 220.

Figure 3A:
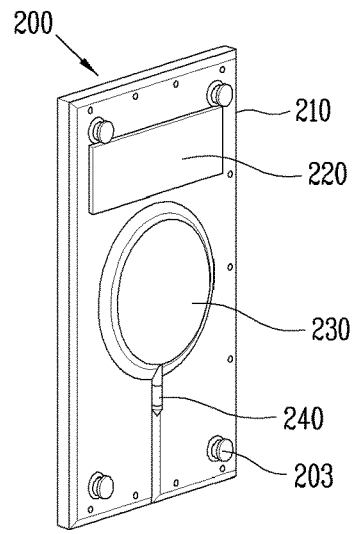
FIG. 3A is a view illustrating a viewing mode of an electronic frame according to one embodiment of the present invention.
Figure 3B:
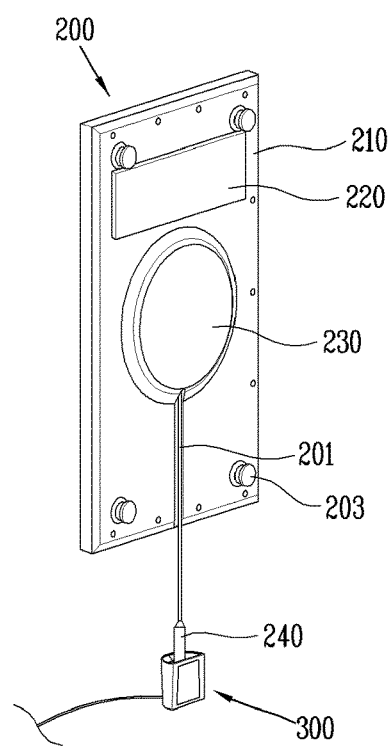
FIG. 3B is a view illustrating a charging mode of the electronic frame according to one embodiment of the present invention.

FIG. 3A illustrates a viewing mode of the electronic frame 200 according to one embodiment of the present invention. FIG. 3B illustrates a charging mode of the electronic frame 200 according to one embodiment of the present invention. As illustrated in FIGS. 3A and 3B, a charge cable 201 may not be exposed to the outside in the viewing mode, whereas the charge cable 201 is exposed to the outside in the charging mode.

At this time, the charger 300 is disposed below the electronic frame 200, and the charging of the electronic frame 200 may be started as electrode portions 243 and 244 (see FIGS. 7A to 7C) drawn out from the electronic frame 200 are brought into contact with the charger 300. However, when the electronic frame 200 is used in a gallery or the like, the charge cable 201 connected to the charger 300 spoils appearance when it is exposed to the outside at a time when visitors are present.

Thus, it is preferable to charge the battery of the electronic frame 200 while there is no visitor or user.

Hereinafter, description will be given of a method of charging the electronic frame 200 automatically or manually using the charger 300 as the device for charging the electronic frame 200. In particular, a method of charging the electronic frame 200 during a period of time without a user or an observer will mainly be described.

Also, since the electronic frame 200 is generally used with being attached to a wall, as illustrated in FIGS. 3A and 3B, fixing units 203 for fixing the electronic frame 200 on the wall protrude from a rear surface of the electronic frame 200.

The electronic frame 200 is provided with a battery 220 therein and displays visual information. A take-up reel 230 (or a take-up reel) for winding or unwinding the charge cable 201 is provided on the rear surface of the electronic frame 200, and a weight 240 is connected to the take-up reel 230 to be lowered when charging the battery 220 and raised again to be located at the rear surface of the electronic frame 200 when discharging the battery 220. The weight 240 should have a predetermined mass or more so as not to be bent when the charge cable 201 is raised or lowered.

At this time, charging the battery 220 refers to a charging mode, and discharging the battery 220 refers to a viewing mode. The viewing mode is generally set during a daytime. In this viewing mode, the battery 220 mainly discharges and thus the charge cable 201 is not exposed to the outside. The charging mode may generally be decided when there is no user or visitor, late at night or by a user-set time, and the like.

A charging assembly of the electronic frame 200 according to one embodiment of the present invention includes the electronic frame 200, and the charger 300 spaced apart from the electronic frame 200 and charging the battery 220.

The take-up reel 230 functions as a bobbin on which the charge cable 201 is wound or unwound. The take-up reel 230 has a predetermined volume so as to be exposed to the rear surface of the electronic frame 200. A length of the fixing unit 203 should be longer than an exposed height of the take-up reel 230 to prevent the take-up reel 230 from being brought into contact with the wall surface. A specific structure of the electronic frame 200 will be described with reference to FIG. 4.

Figure 4:
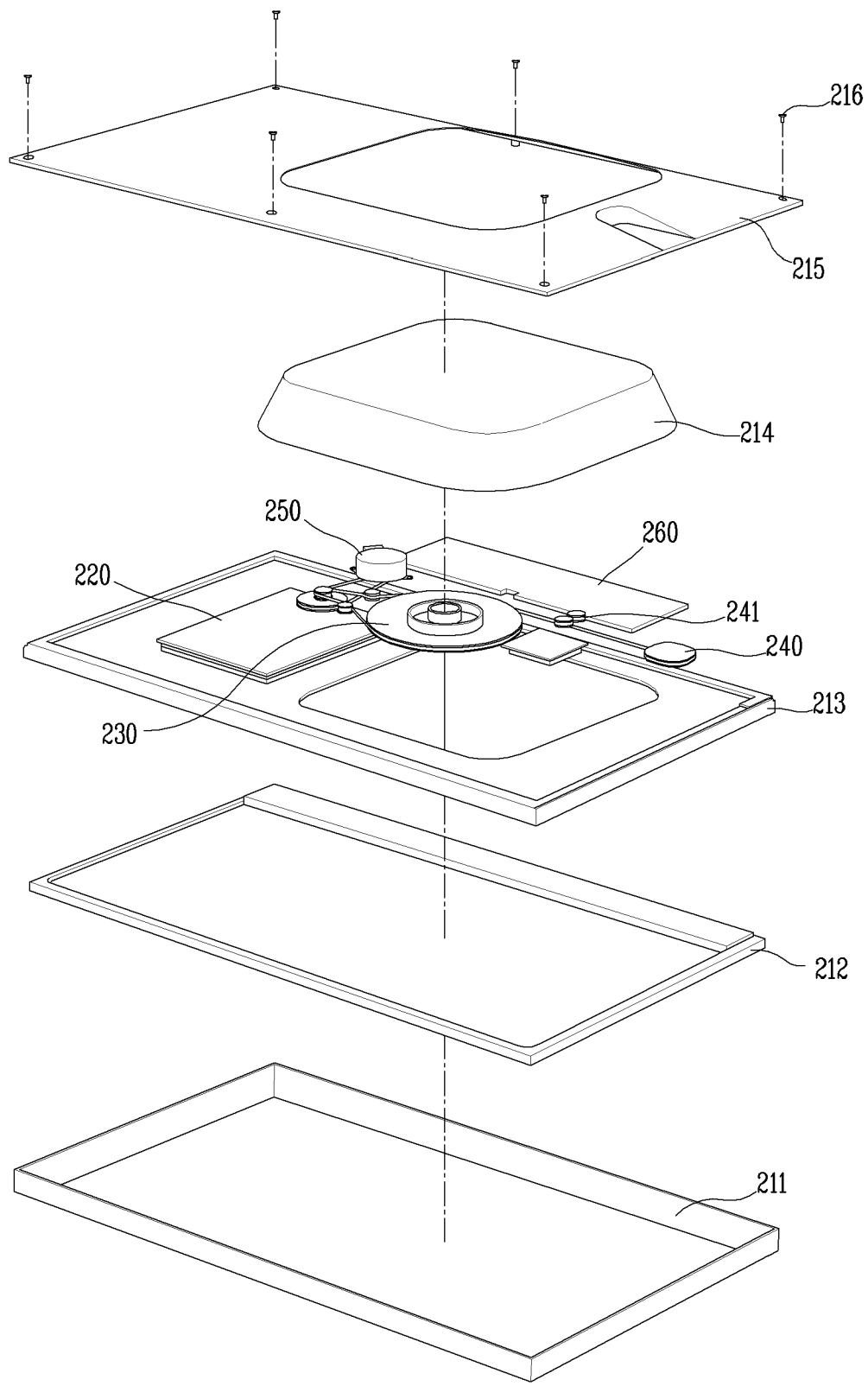
FIG. 4 is an exploded perspective view of an electronic frame according to one embodiment of the present invention.
Figure 5:
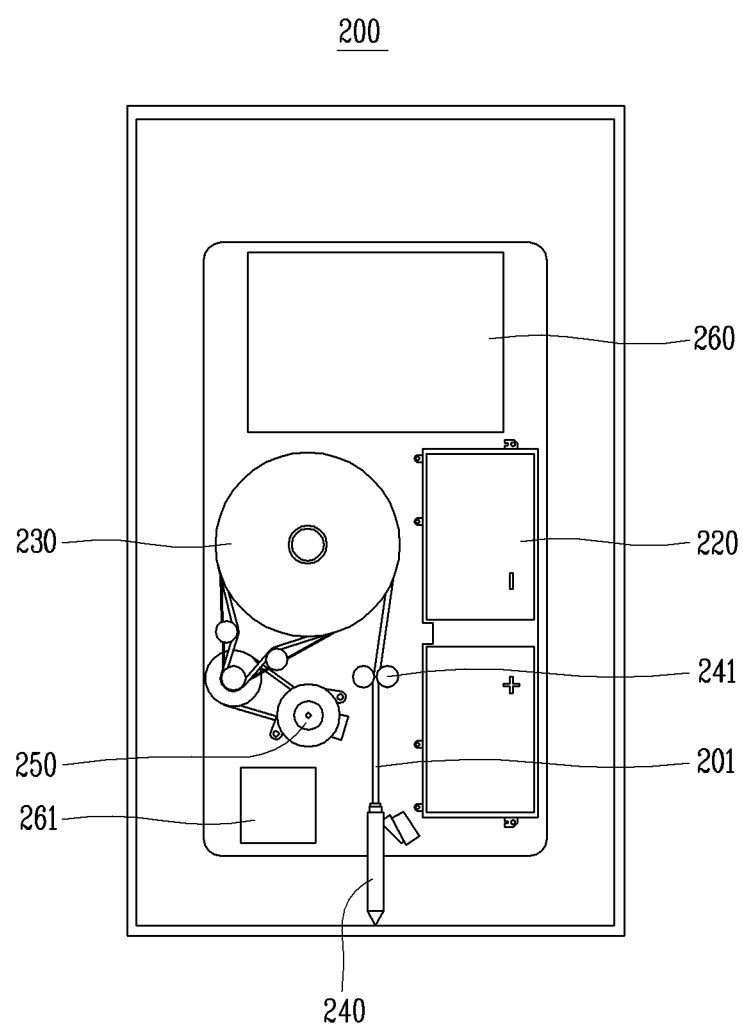
FIG. 5 is a front view of an electronic frame according to one embodiment of the present invention.

FIG. 4 is an exploded perspective view of an electronic frame 200 according to one embodiment of the present invention, and FIG. 5 is a front view of the electronic frame 200 according to the one embodiment of the present invention.

Referring to FIGS. 4 and 5, the electronic frame 200 according to the one embodiment of the present invention includes a front frame 211 disposed on a front surface thereof and having a hole formed therein, a display unit 212 disposed on a rear surface of the front frame 211 to output visual information to outside through the front frame 211, a support frame 213 disposed on a rear surface of the display unit 212 to support the display unit 212, and a rear cover 215 covering the support frame 213.

A plurality of electronic components, for example, a main circuit board 260, may be mounted on the support frame 213. Further, a motor 250 for generating driving force for moving the charge cable 201 up and down is provided on the support frame 213. The main circuit board 260 controls the motor 250 to charge or discharge the battery 220. The rear cover 215 is coupled to the support frame 213 and the front frame 211 by coupling members 216. One end of the charge cable 201 is coupled to the take-up reel 230 and another end thereof is coupled to the weight 240. The weight 240 may be made of a metal material having a predetermined mass or more so as to be stably in contact with the charger 300 provided below the electronic frame 200. The weight 240 includes electrode portions 243 and 244 electrically connected to the charger 300. A weight guide 241 for guiding the movement of the charge cable 201 when the weight is lowered or raised is provided inside the electronic frame 200. The weight guide 241 may be configured in any shape if it protrudes from a fixed surface such as the rear cover 215 or the support frame 213. FIG. 5 illustrates a pair of weight guides 241 but the present invention is not necessarily limited to this. Alternatively, the weight 240 may be guided merely by one protrusion. At this time, the main circuit board 260 is provided with a PCB driver 261 for driving the main circuit board 260, and the battery 220 is disposed on one side of the take-up reel 230. Also, the weight 240 moves through a bottom of a center of the electronic frame 200. A cover 214 for covering and protecting the components such as the motor 250 and the take-up reel 230 is provided to cover the rear surface of the support frame 213. The cover 214 may be exposed to the outside through a hole formed through the rear cover 215 so as to be brought into contact with a wall when installing the electronic frame 200.

Figure 6A:
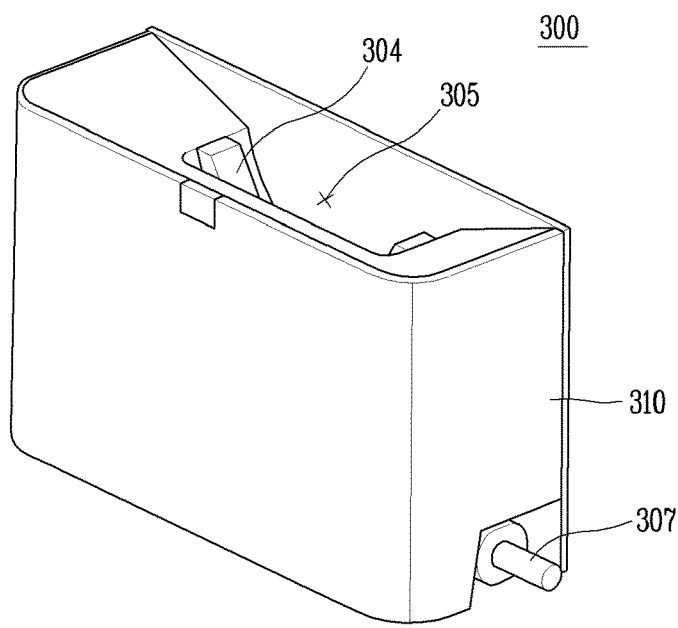
FIG. 6A is a perspective view of a charger according to one embodiment of the present invention.
Figure 6B:
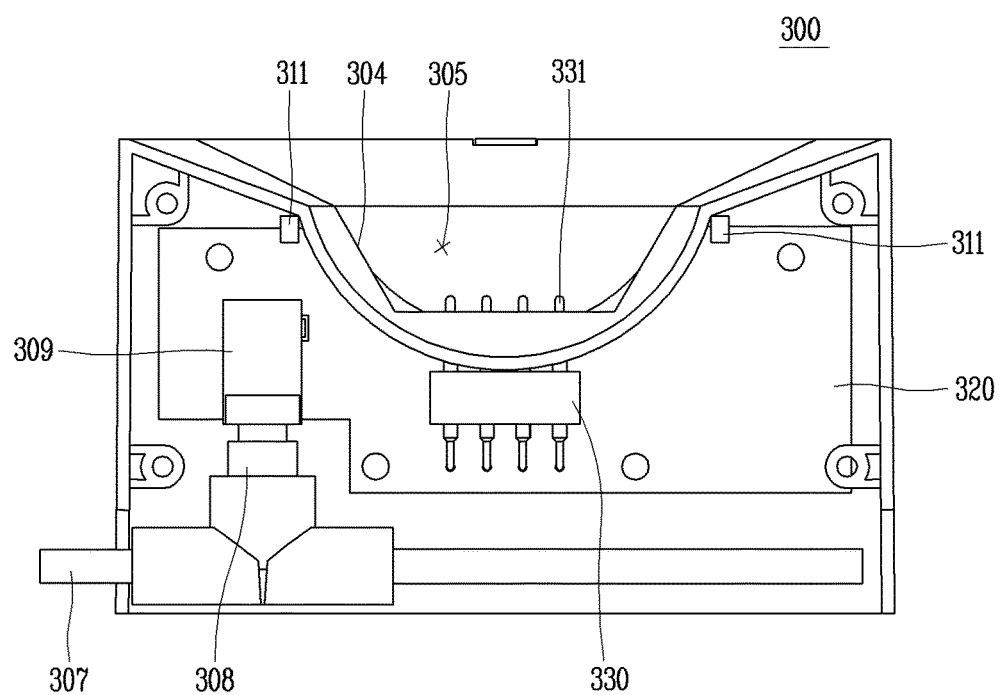
FIG. 6B is a sectional view of FIG. 6A.

FIG. 6A is a perspective view of a charger 300 according to one embodiment of the present invention, and FIG. 6B is a sectional view of FIG. 6A. As illustrated in FIGS. 6A and 6B, the charger 300 includes a case 310 defining appearance, an insertion groove 305 formed in an upper side of the case 310 to facilitate an insertion of the weight 240 therein, and a connector 330 provided therein to be electrically brought into contact with the electrode portions 243 and 244 provided on the weight 240. The connector 330 may be a C-clip or a pogo pin, but the type is not particularly limited. FIG. 6B illustrates a contact terminal 331 in the form of a pogo pin as an example. A charger circuit board 320 for controlling internal components of the charger 300 is provided inside the charger 300 and magnetic members 311 may be provided on one side of the insertion groove 305. According to the one embodiment of the present invention, the magnetic members 311 are disposed inside the charger 300 such that the weight 240 can be brought into contact more firmly with the connector 330 after being inserted into the insertion groove 305 when the weight 240 is made of a material containing a metal. The electrode portions 243 and 244 of the weight 240 can stably contact the connector 330 by magnetic attraction between the magnetic members 311 and the weight 240.

At this time, the weight 240 is descended due to its own weight at the time of charging and is automatically connected to the charger 300. On the other hand, the take-up reel 230 is driven by the motor 250 to pull the weight 240 upward to stop charging at the time of discharging. The charger 300 receives power from an external power supply unit 350 (see FIG. 18B) through a power cable 307. A first contact terminal 308 is provided on the power cable 307, and a second contact terminal 309 is provided on the charger circuit board 320. That is, one side of the second contact terminal 309 is connected to the first contact terminal 308 and another side of the second contact terminal 309 is electrically connected to the charger circuit board 320 to supply power from the power supply unit 350 to the electronic frame 200, thereby charging the battery 220.

Figure 7A:
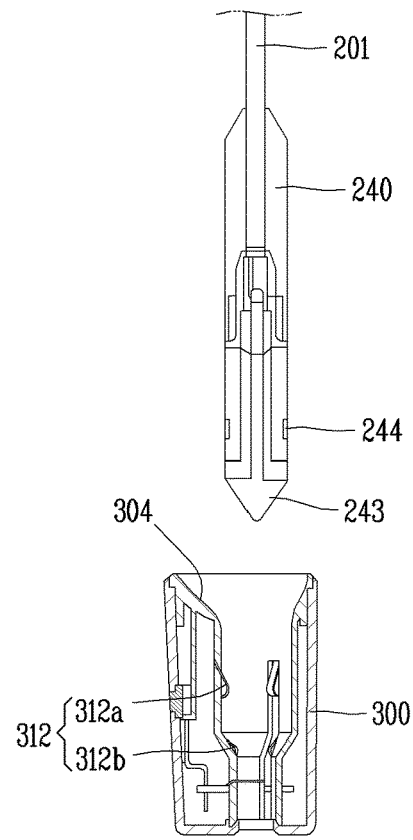
FIGS. 7A to 7C are views illustrating a process of coupling a weight to a charger in accordance with one embodiment of the present invention.
Figure 7B:
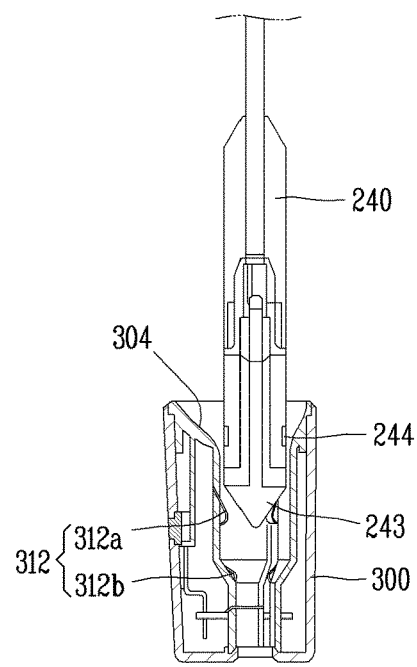
Figure 7C:
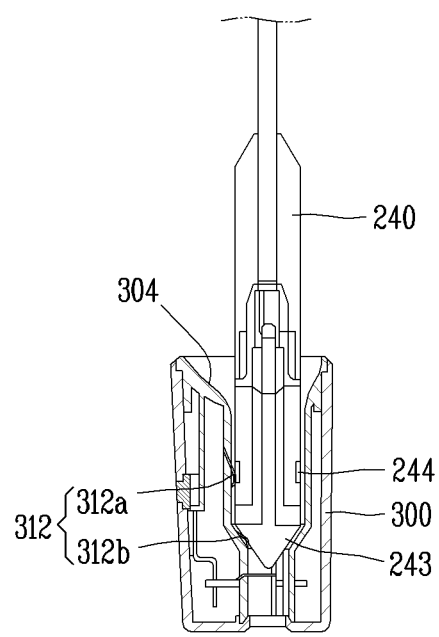
Figure 8A:
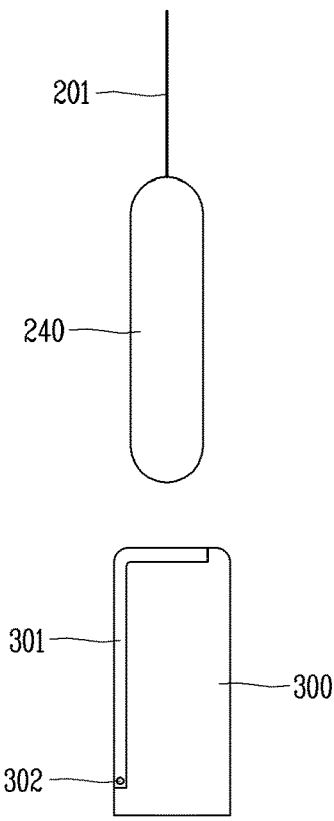
FIGS. 8A and 8B are views illustrating that a weight is coupled to a charger provided with a cover in accordance with one embodiment of the present invention.
Figure 8B:
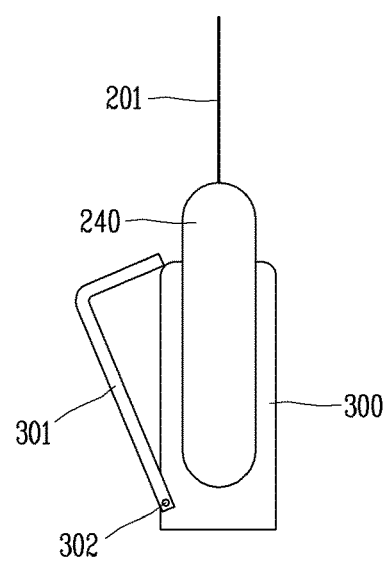
Figure 9:
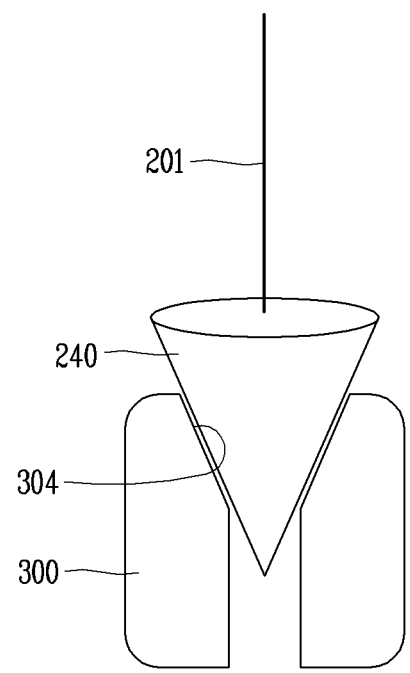
FIG. 9 is an exemplary view of a weight in a conical shape according to one embodiment of the present invention.
Figure 10A:
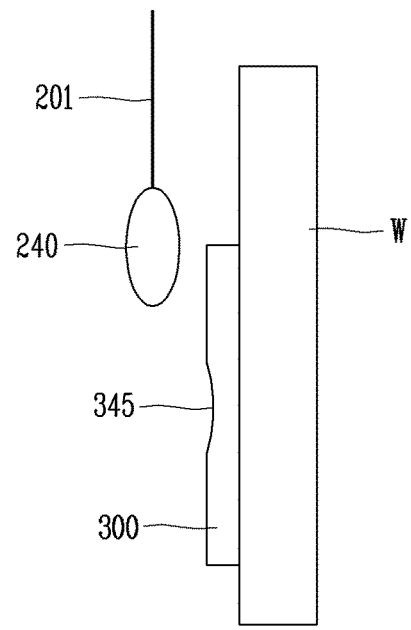
FIGS. 10A to 10C are views illustrating an example of utilizing a charger using a wall surface according to one embodiment of the present invention.
Figure 10B:
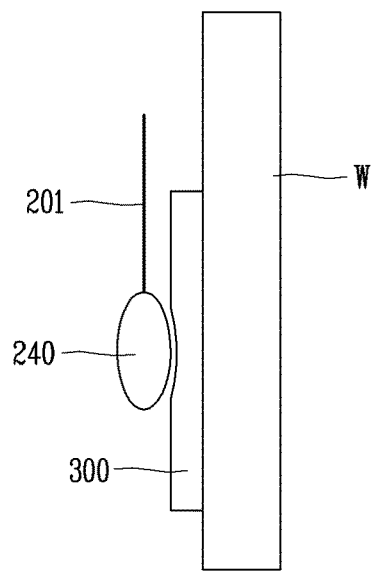
Figure 10C:
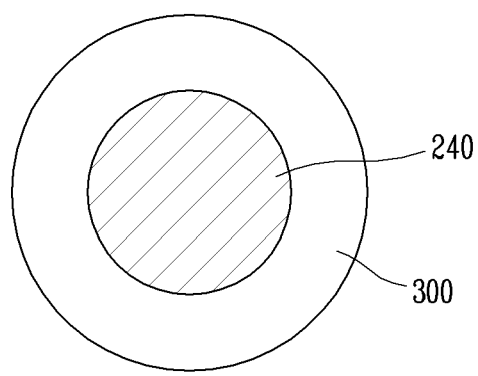

FIGS. 7A to 7C are views illustrating a process of coupling the weight 240 to the charger 300 according to one embodiment of the present invention. FIGS. 8A and 8B are views illustrating that the weight 240 is mounted to the charger 300 provided with a cover according to one embodiment of the present invention. FIG. 9 is an exemplary view illustrating a case in which the weight 240 is formed in a conical shape according to one embodiment of the present invention, and FIGS. 10A to 10C are views illustrating examples of utilizing the charger 300 using a wall surface according to one embodiment of the present invention.

Hereinafter, a charging mode according to the shapes of the weight 240 and the charger 300 will be described with reference to FIGS. 7A to 10C.

First, the weight 240 is formed to be streamlined downward. The charger 300 is provided with the insertion groove 305 having a shape corresponding to or similar to the shape of a front end portion of the weight 240. An inclined guide 304 for guiding the weight 240 is formed at an inlet side of the insertion groove 305.

FIG. 6B illustrates the case where contact terminals 331 of the connector 330 disposed in the charger 300 are configured in the form of the pogo pin and the contact terminals 311 are formed at the same height, but FIGS. 7A to 7C illustrate that contact terminals 312a and 312b are formed at different heights. For this purpose, the electrode portions 243 and 244 formed on the weight 240 should be provided at positions corresponding to the positions of the contact terminals 312a and 312b. For example, the first electrode portion 243 is disposed at a position closer to a lower end of the weight 240, and the second electrode portion 244 is disposed above the first electrode portion 243. The first contact terminal 312a of those contact terminals is disposed in an upper portion of the charger 300 and the second contact terminal 312b may be disposed below the first contact terminal 312a. Accordingly, as the weight 240 is moved down, the first electrode portion 243 and the first contact terminal 312a are first electrically connected to each other, and then the second electrode portion 244 and the second contact terminal 312b are electrically connected to each other.

At this time, the first and second electrode portions 243 and 244 and the first and second contact terminals 312a and 312b may have a positive (+) pole or a negative (−) pole, respectively, and the first and second contact terminals 312a and 312b may be made of a material having elasticity.

FIG. 7A illustrates a state before the weight 240 is inserted into the charger 300, FIG. 7B illustrates a state while the weight 240 is inserted into the charger 300, and FIG. 7C illustrates a state in which the weight is completely inserted into the charger 300 such that the first and second electrode portions 243 and 244 are electrically connected to the first and second contact terminals 312a and 312b, respectively.

On the other hand, the insertion groove 305 is provided in the upper portion of the charger 300, as aforementioned. Since the weight 240 is not coupled to the charger 300 at the time of discharging the electronic frame 200, foreign substances such as dust and the like may be introduced through the insertion groove 305. As illustrated in FIGS. 8A and 8B, the charger 300 is provided with a cover 301 having a hinge at one side thereof to be rotatable centering on the hinge 302 so as to selectively cover a top surface of the charger 300. That is, as illustrated in FIG. 8A, the cover 301 covers the top surface of the charger 300 while the weight 240 is not coupled to the charger 300, so as to prevent an introduction of foreign substances into the charger 300 during discharging. As illustrated in FIG. 8B, only at the time of charging, the cover 301 may rotate centering on the hinge 302 to open the top surface of the charger 300, namely, the insertion groove 305 such that the weight 240 can be inserted into the charger 300 to be charged.

In addition, in one embodiment of the present invention, the weight 240 should be easily inserted into the insertion groove 305 of the charger 300. For this purpose, in one embodiment of the present invention, the weight 240 may have a front end portion formed in a conical shape. At this time, when the inclined guide 304 of the charger 300 has the same shape as the weight 240, the weight 240 can be inserted into the charger 300 more easily. The inclined guide 304 may has a flat or curved shape and may be formed to be inclined downward.

In this manner, the shape of the weight 240 may be a problem in terms of facilitating the weight to be coupled to the charger 300. FIGS. 10A and 10B have illustrated the case where the weight 240 has a disc shape. That is, the weight 240 may be formed in the disc shape, and the charger 300 to which the weight is coupled may be provided with a recess portion 345 in which the weight can be seated. The charger 300 may be provided with a magnetic member (not shown) therein to assist the weight 240 to be mounted in the recess portion 345 to be charged. At this time, FIG. 10C illustrates a state in which the weight 240 is mounted on the charger 300. For example, the weight 240 may have a positive pole and the charger 300 may have a negative pole, or vice versa.

At this time, the charger 300 is mounted on a side wall W. When the battery 220 is to be charged, the weight 240 is attracted to the charger 300 by a magnetic force so as to be electrically connected to the charger 300, such that the battery 220 of the electronic frame 200 can be charged.

The foregoing description has been given of the case where there is only one electronic frame 200 and one charger 300 for charging the electronic frame 200. Hereinafter, a configuration for charging a plurality of electronic frames 200 will be described.

Figure 18A:
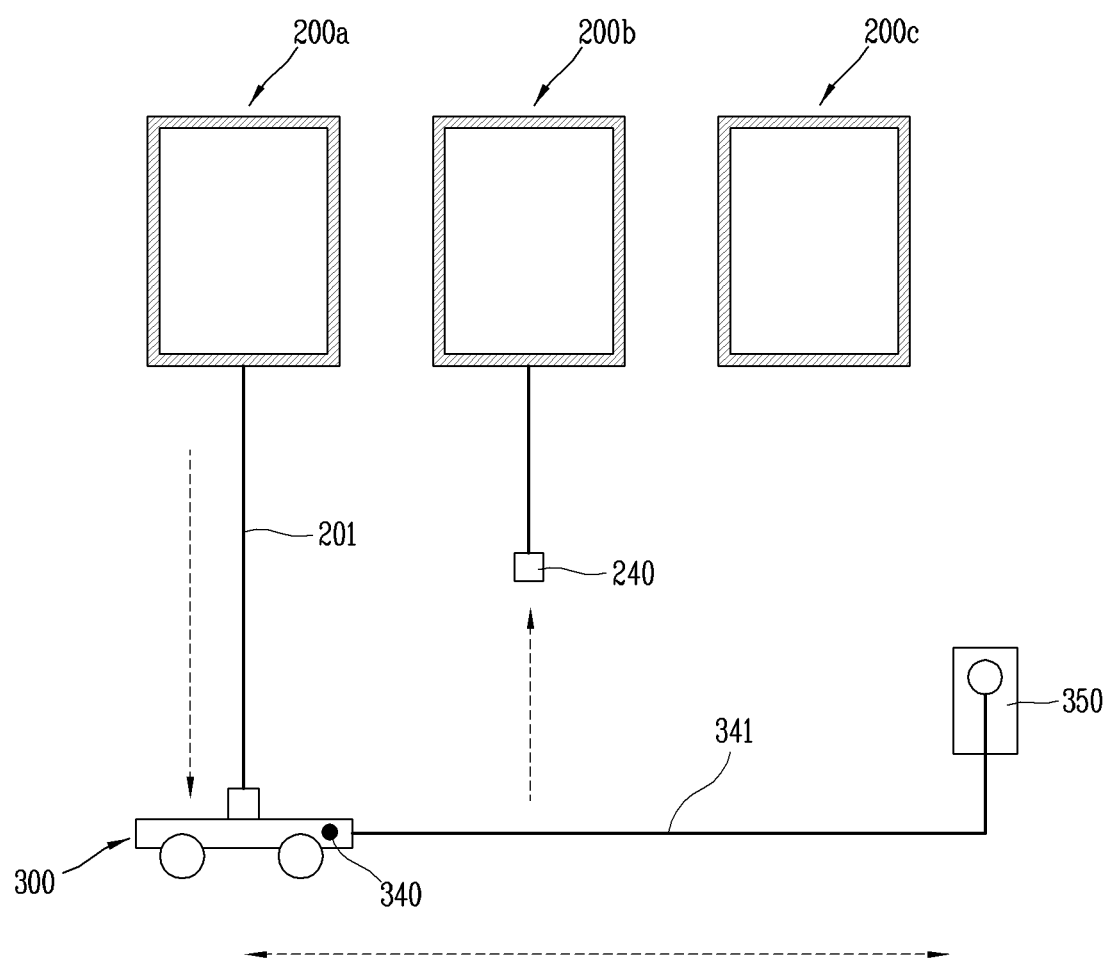
FIGS. 18A and 18B are views illustrating an example of charging a plurality of electronic frames with one charger according to an embodiment of the present invention.

FIG. 18A is a view illustrating that a plurality of electronic frames 200 are charged with one charger 300 according to one embodiment of the present invention, in which when the electronic frame 200 is in plurality, a charger 300 capable of charging batteries 220 of the plurality of electronic frames 200a, 200b, and 200c while moving below the electronic frames 200a, 200b, and 200c.

That is, when the first to third electronic frames 200a, 200b, 200c are disposed at preset intervals along one direction, a rail 341 may be formed below the first to third electronic frames 200a, 200b, and 200C from a power supply unit 350 for supplying power to the charger 300. The charger 300 may charge the first to third electronic frames 200a, 200b and 200c by moving along the rail 341.

For example, when desiring to charge the first electronic frame 200, the charger 300 may move along the rail 341 to a position below the first electronic frame 200a to charge the first electronic frame 200a. On the other hand, when desiring to charge the second electronic frame 200b, the charger 300 may move along the rail 341 to a position below the second electronic frame 200b to charge the second electronic frame 200b.

At this time, each of the electronic frame 200 and the charger 300 may be provided with a wireless transceiver 340, and thus the charger 300 can detect the position of the electronic frame 200. This may allow the charger 300 to be located at correct positions below the first to third electronic frames 200a, 200b, and 200c.

Figure 18B:
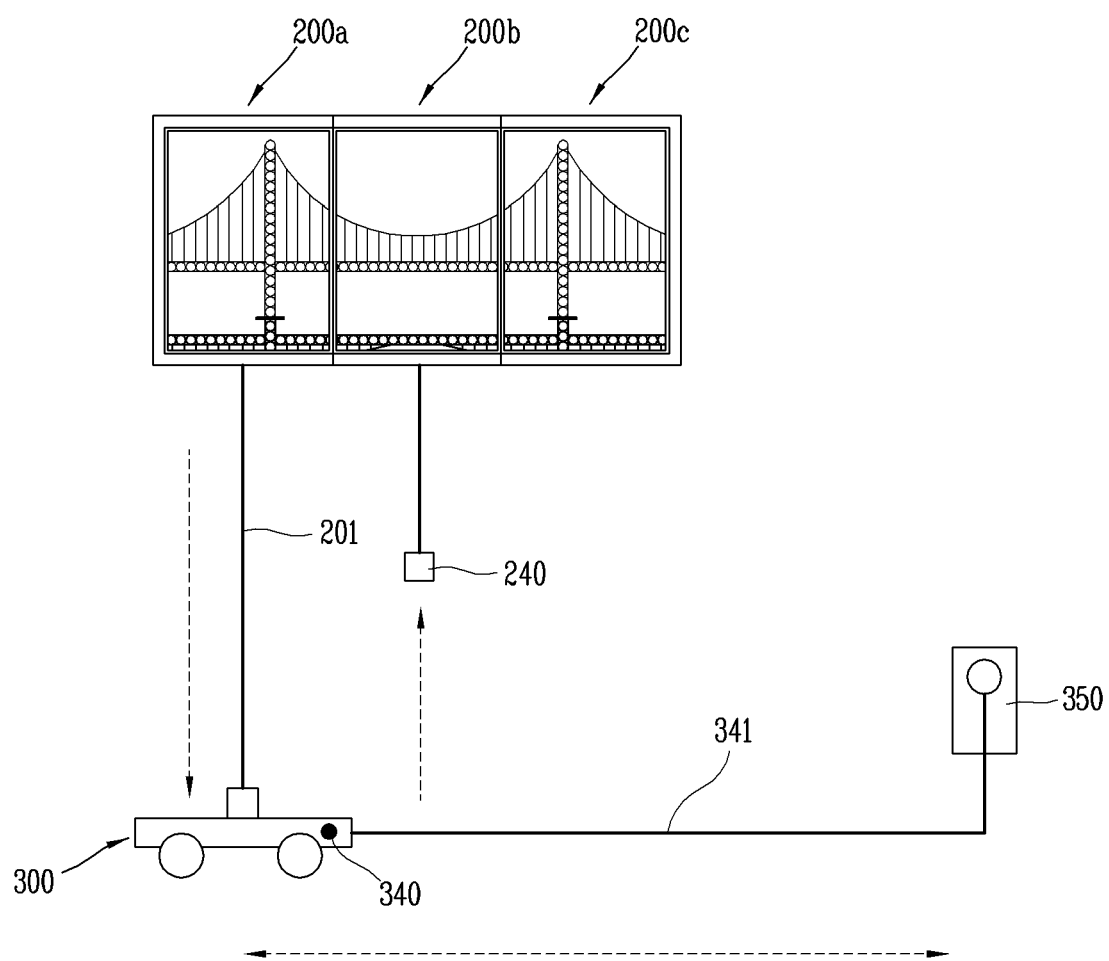

FIG. 18B illustrates a state in which the first to third electronic frames 200a, 200b and 200c are connected to be in close contact with one another so that the first to third electronic frames 200a, 200b and 200c can form a larger electronic frame so as to output one image. Even at this time, charging may also be performed in the same manner as that in FIG. 18A.

Figure 19A:
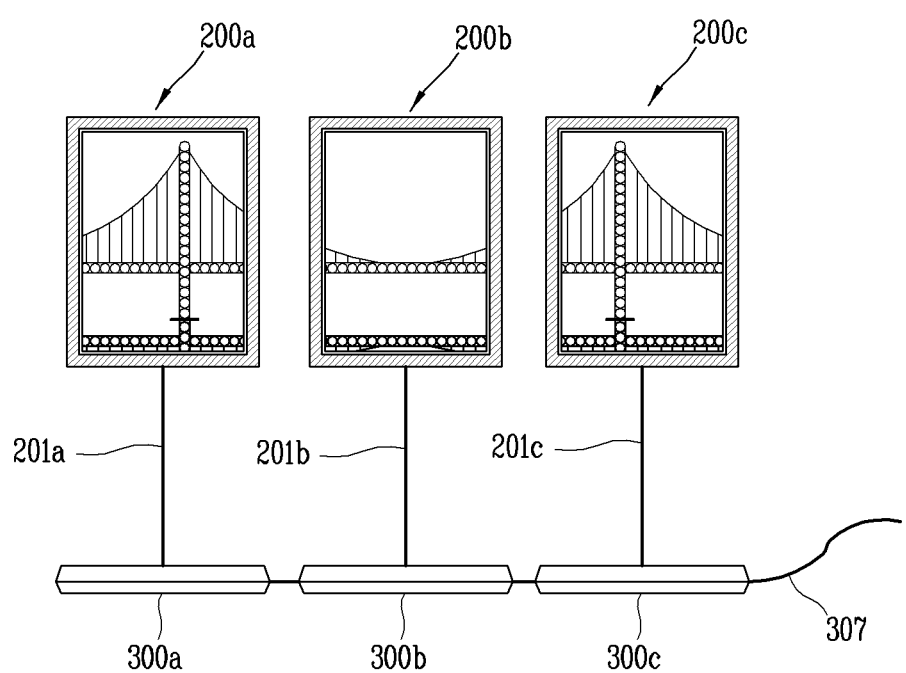
FIGS. 19A to 19C are views illustrating a method of charging a plurality of electronic frames with one charger or a plurality of chargers according to one embodiment of the present invention.

FIG. 19A is a view illustrating charging of the electronic frame 200 when a plurality of electronic frames 200 are provided and a plurality of chargers 300 are also provided. As illustrated in FIG. 19A, when the electronic frame 200 includes first to third electronic frames 200a, 200b, and 200c, first to third chargers 300a, 300b, and 300c corresponding to the first to third electronic frames 200a, 200b, and 200c are provided below the first to third electronic frames 200a, 200b, and 200c. The first to third chargers 300a, 300b, and 300c are connected by one power cable 307.

The first to third electronic frames 200a, 200b, and 200c and the first to third chargers 300a, 300b and 300c may be connected to each other by first to third charge cables 201a, 201b and 201c, respectively. At this time, controllers (not shown) provided on main circuit boards 260 of the respective first to third electronic frames 200a, 200b, and 200c may be individually operated to charge the electrode frames desired to be charged among the first to third electronic frames 200a, 200b, and 200c. For example, when only the first electronic frame 200 is to be charged, only the first charge cable 201a may be connected to the first charger 300a. On the other hand, when all of the first to third electronic frames 200a, 200b, and 200c are to be charged, all of the first to third charge cables 201a, 201b, and 20ac may be connected to the first to third chargers 300a, 300b, and 300c, respectively. In this case, since there is only one power cable 307 connected to the first to third chargers 300a, 300b and 300c, even individual control for the first to third chargers 300a, 300b and 300c may be sufficiently made by the single power cable 307, which may result in simplifying a configuration of the apparatus.

Figure 19B:
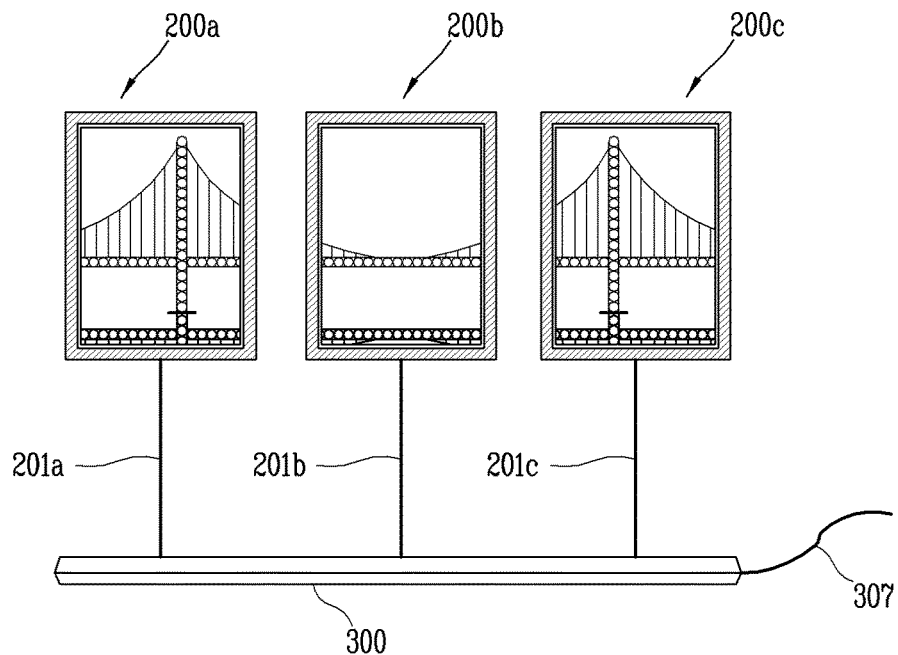

FIG. 19B illustrates a charging process in a state where there are the plurality of electronic frames 200a, 200b, and 200c and one charger 300 is disposed below the plurality of electronic frames 200a, 200b, and 200c. Referring to FIG. 19B, the charger 300 and the plurality of electronic frames 200a, 200b, and 200c may be connected by first to third charge cables 201a, 201b, and 201c. To this end, three contact terminals (not shown) must be provided on the charger 300. The first to third charge cables 201a to 201c are selectively lowered by the controllers of the first to third electronic frames 200a, 200b, and 200c and connected to the charger 300, such that a battery of the selected electronic frame can be charged.

Figure 19C:
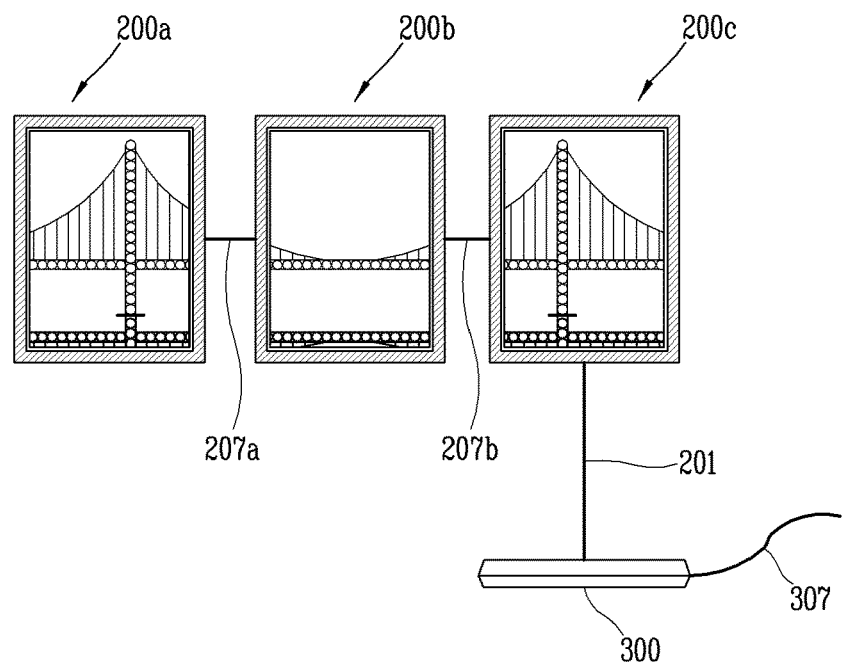

FIG. 19C illustrates a process of charging the electronic frames 200a, 200b, and 200c by a structure in which the plurality of electronic frames 200a, 200b, and 200c are provided to be connected together by connection cables 207a and 207b, and one of the plurality of electronic frames 200a, 200b, and 200c is connected to the charger 300 by a charge cable 201. Referring to FIG. 19C, the first and second electronic frames 200a and 200b are connected to each other by the first connection cable 207a, the second and third electronic frames 200b and 200c are connected to each other by the second connection cable 207b, and the third electronic frame 200c is connected to the charger 300 by the charge cable 201. In this case, the first to third electronic frames 200a, 200b, and 200c may be simultaneously charged or simultaneously discharged. When the first to third electronic frames 200a, 200b, and 200c are simultaneously discharged, the charge cable 201 may be located inside the third electronic frame 200c. This may allow the plurality of electronic frames 200a, 200b, 200c to be charged at once and also make the appearance neat when discharging.

Figure 21A:
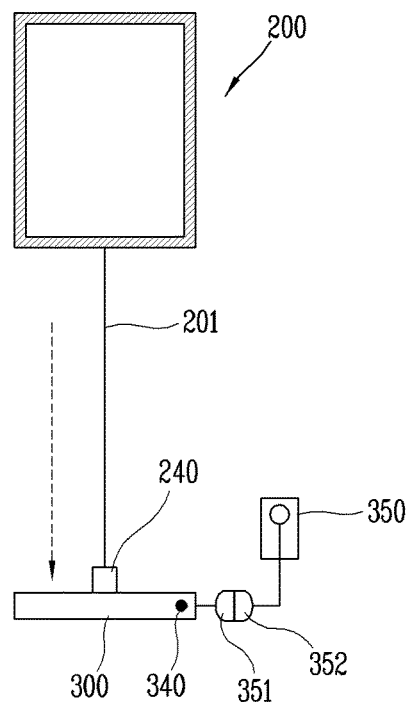
FIGS. 21A and 21B are views illustrating a charger provided with a power supply connection portion in accordance with one embodiment of the present invention.
Figure 21B:
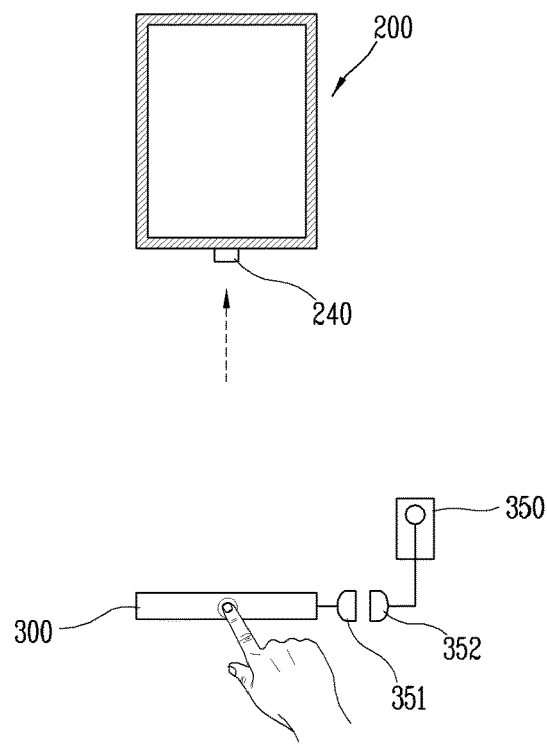

FIG. 21A illustrates a state where power supply connection portions 351 and 352 are connected to each other in a charging mode according to one embodiment of the present invention, and FIG. 21B illustrates a state where the power supply connection portions 351 and 352 are separated from each other in a discharging mode.

The charger 300 is provided on a floor and the charge cable 201 extends down to the charger 300 when charging the electronic frame 200. Since the charger 300 is provided on the floor, a safety problem may be caused. For example, there is possibility that children or pets touch the charge cable 201 or are struck by an electric shock due to the power supply unit 350. Therefore, it is necessary to make the charge cable 201 obscured by a rear surface of the electronic frame 200 and simultaneously to cut off power supplied from the power supply unit 350 to the charger 300. That is, when power is supplied to the charger 300 to charge the battery 220, the power supply connection portions 351 and 352 connected to the charger 300 and the power supply unit 350 are connected to each other. On the other hand, the power supply connection portions 351 and 352 are not connected to each other when the battery 220 is discharged.

Hereinafter, a method of setting a charging time of the electronic frame 200 will be described.

Figure 11:
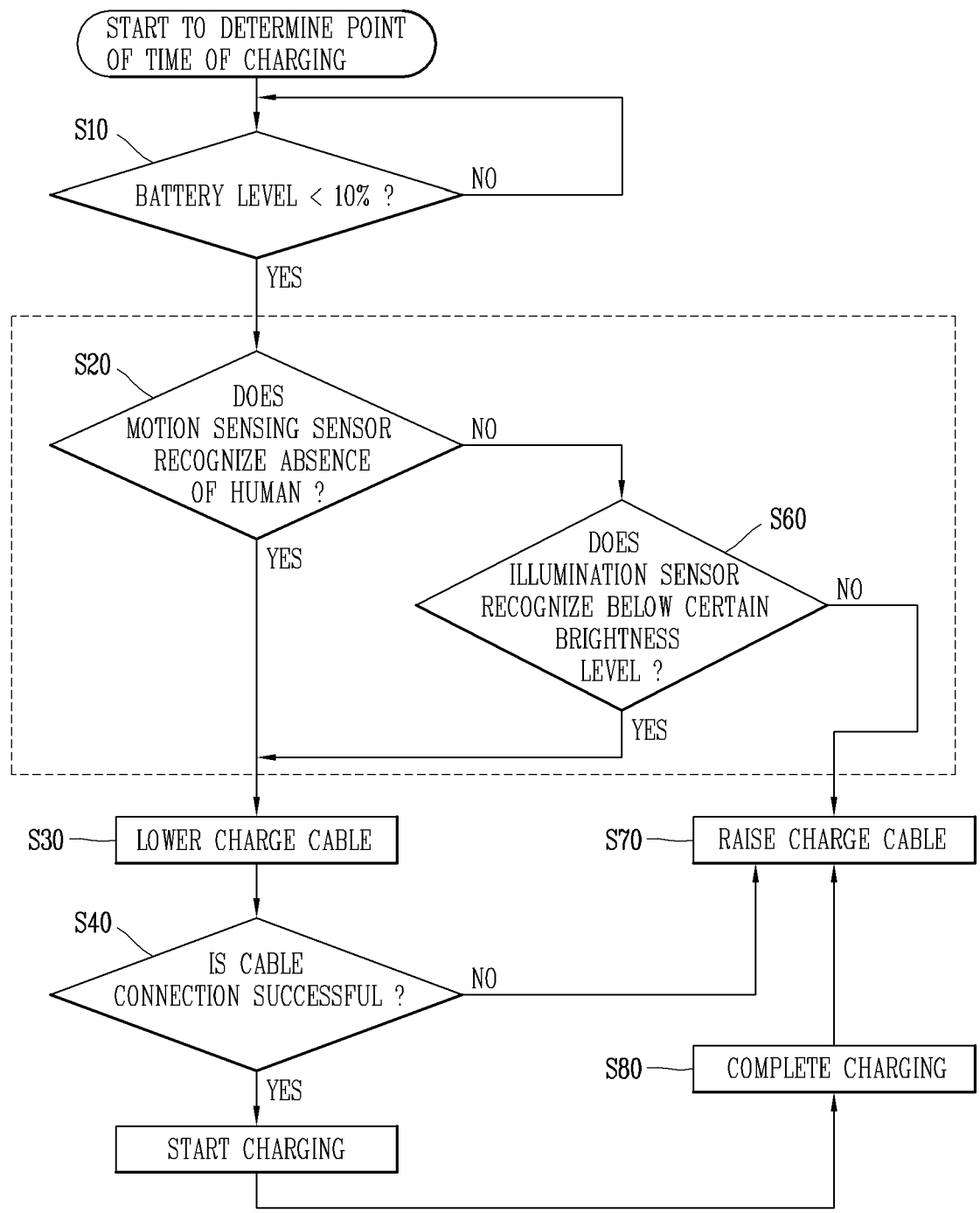
FIG. 11 is a flowchart for determining a time point (point of time) of charging according to one embodiment of the present invention.

FIG. 11 is a flowchart for setting a charging time point according to one embodiment of the present invention. Hereinafter, a method of automatically charging the electronic frame 200 will be described with reference to FIG. 11.

In order to charge the electronic frame 200 according to one embodiment of the present invention, the electronic frame 200 provided with the battery 220 and the charger 300 arranged apart from the electronic frame 200 for charging the electronic frame 200 are required. The method of charging the electronic frame 200 includes determining whether the capacity (battery level) of the battery 220 is less than a preset value (or level) (S10), detecting a movement of an object around the electronic frame 200 (S20), and electrically connecting the electrode portions 243 and 244 provided on the electronic frame 200 to the charger 300 when the movement of the object is not detected (S30). For example, the battery 220 may enter the charging mode when the battery capacity is less than 10%, but the present invention is not limited thereto.

The movement around the electronic frame 200 is detected by use of a motion detection sensor. An example of the motion detection sensor is an Electronic Potential Integrated Circuit (EPIC) sensor. In this manner, the reason for sensing or detecting the movement around the electronic frame 200 is to avoid charging as much as possible when there is a user or a visitor around the electronic frame 200. This is because if the electronic frame 200 is charged when any visitor is present around the electronic frame 200, the charge cable 201 is exposed to the outside and thereby interferes with appreciation of an image output through the electronic frame 200.

Furthermore, the charging is preferably performed at night because there is high probability of presence of a user or a visitor during the daytime. For this, in one embodiment of the present invention, brightness is sensed through an illumination sensor (not shown) (S60), and the electronic frame 200 is charged only when the sensed brightness is less than preset brightness.

In this manner, the battery 220 can be charged from time to time after comprehensively considering the battery capacity of the electronic frame 200, the movement around the electronic frame 200, the brightness around the electronic frame 200, and the like.

As illustrated in FIG. 11, when there is no movement around the electronic frame 200 and brightness is less than the preset brightness, a process for charging the battery 220 is performed. That is, the charge cable 201 wound on the electronic frame 200 is lowered (S30) and coupled to the charger 300 (S40) to start charging (S50). At this time, there may occur a case where the charge cable 201 is not properly seated in the insertion groove 305 of the charger 300. In this case, the charge cable 201 is raised again (S70) and the previous processes are repeatedly performed. When the charging is completed through those processes (S80), the charging mode may be completed by raising the charge cable 201.

As described above, when the charge cable 201 and the weight 240 are lowered for charging, the weight 240 may not be seated in a correct position of the charger 300.

Figure 15A:
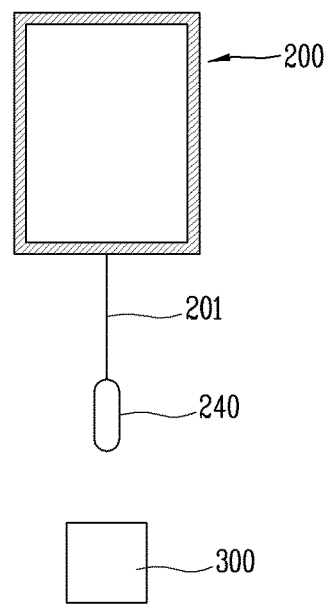
FIGS. 15A to 15C are views illustrating a case where a weight is not positioned in a correct position according to one embodiment of the present invention.
Figure 15B:
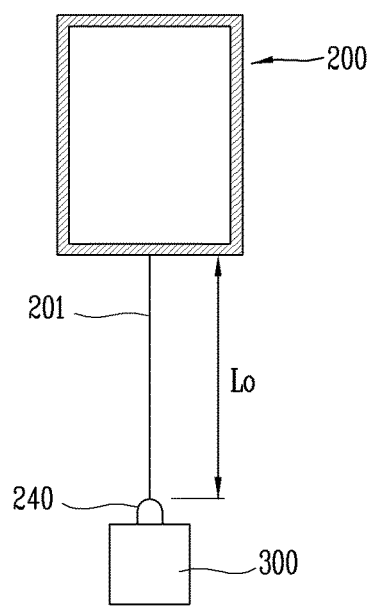
Figure 15C:
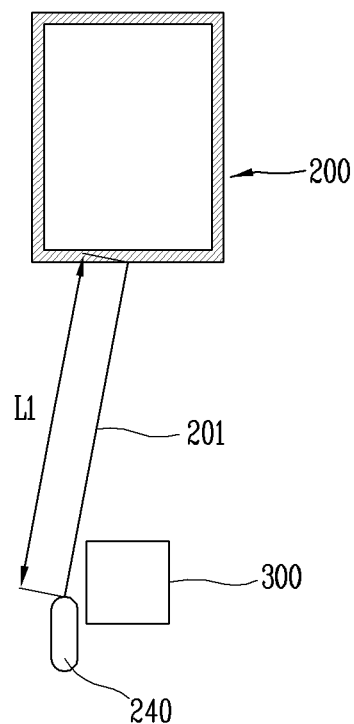

FIGS. 15A to 15C are views illustrating a case in which the weight 240 is not located in a correct position. Hereinafter, the case will be described with reference to FIGS. 15A to 15C.

FIG. 15A illustrates a process in which the weight 240 is moved down toward the charger 300, and FIG. 15B illustrates a state in which the weight 240 is seated in a correct position of the charger 300. A length of the charge cable 201 when the weight 240 is seated in the correct position of the charger 300 is referred to as L0 and stored in the controller. When the length of the charge cable 201 is longer or shorter than L0, it may be determined as an abnormal state and informed to the user. That is, as illustrated in FIG. 15C, when a length L1 that the charge cable is drawn out of the electronic frame 200 is longer than L0, it may be understood that the weight 240 is not seated in the correct position of the charger 300.

In this case, the user can be notified through the mobile terminal 100 or the like.

Figure 17:
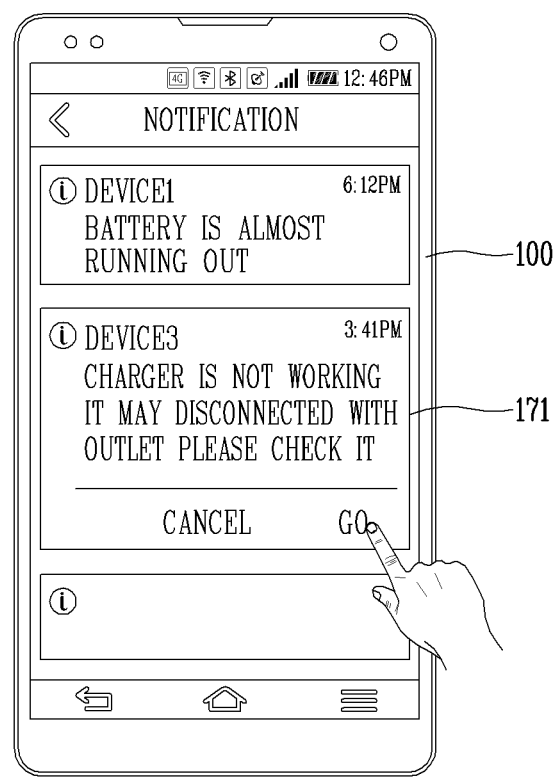
FIG. 17 is a view illustrating a process of transmitting a message to a user when an error occurs according to one embodiment of the present invention.

FIG. 17 is a view illustrating that a message is transmitted to a user when an error occurs according to an embodiment of the present invention, in which an error message window 171 is displayed on the mobile terminal 100. In this manner, when the weight 240 is not properly mounted to the charger 300, a notification message may be displayed on the mobile terminal 100 so that the user can treat it. At this time, the present invention is not necessarily limited to the example of outputting the error message window on the mobile terminal 100, but alternatively the error message window may be output on the display unit 212 of the electronic frame 200.

Meanwhile, even if the weight 240 is seated in the correct position of the charger 300, the charge cable 201 may be likely to be elongated longer than necessary.

Figure 16A:
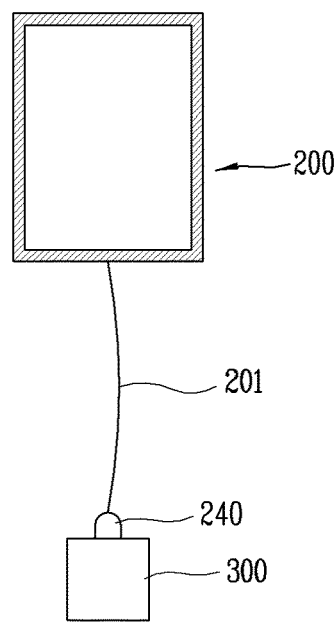
FIGS. 16A and 16B are views illustrating a process of tightening a charge cable according to one embodiment of the present invention.
Figure 16B:
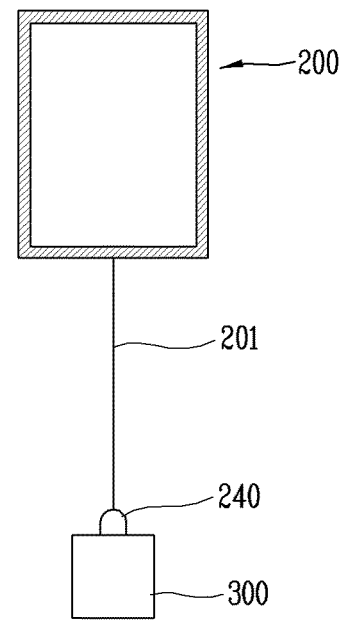

FIGS. 16A and 16B are views illustrating a process of tightening the charge cable 201 according to one embodiment of the present invention. FIG. 16A illustrates a state in which the weight 240 is seated on a top of the charger 300 but the charge cable 201 is drawn out excessively long. Even in this case, as illustrated in FIGS. 11 and 17, it is notified to the user through the mobile terminal 100, and then the charge cable 201 is wound up (S70). Afterwards, when the charge cable 201 is lowered again, the charge cable 201 is tightened by gravity.

Although the method of automatically setting the charging time has been described above, the present invention is not necessarily limited to this.

Figure 12:
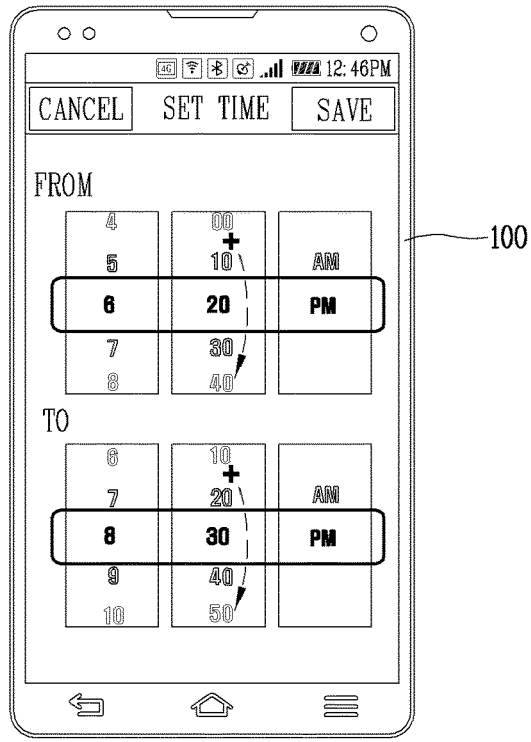
FIG. 12 is a view illustrating an example of setting a charging time according to one embodiment of the present invention.
Figure 14:
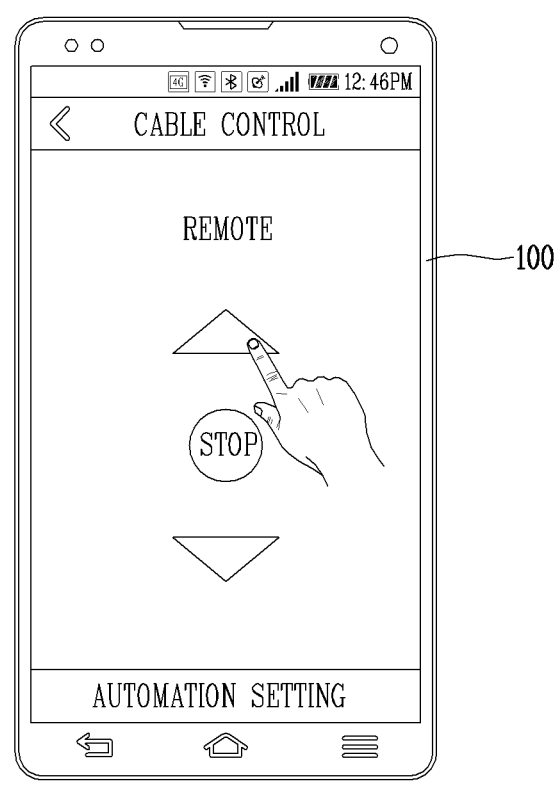
FIG. 14 is a view illustrating an example of setting a charging time by a manual operation according to one embodiment of the present invention.

FIG. 12 illustrates setting of the charging time according to one embodiment of the present invention. It may be seen that the user can directly set a desired time through the mobile terminal 100. For example, by setting start and end of a charging time, charging may be performed for such set time. FIG. 14 illustrates setting of a charging time by a manual operation according to one embodiment of the present invention. Unlike FIG. 12, which is a method of directly inputting a time, the charging time is set in an up/down manner.

Figure 13:
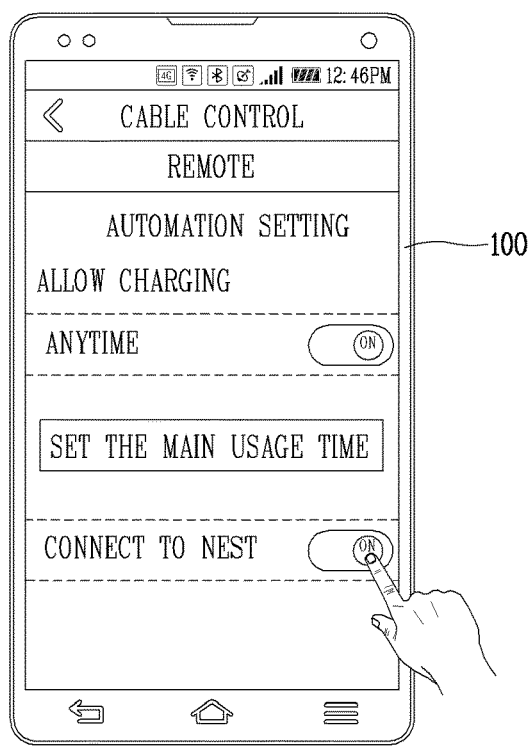
FIG. 13 is a view illustrating an example of setting a charging time using an IoT device in accordance with one embodiment of the present invention.

FIG. 13 illustrates setting of a charging time by using an Internet of Things (IoT) device (for example, NEST) according to one embodiment of the present invention. The charging time can also be set even when every family member is present outside in a manner of being connected to the IoT device. At this time, the charge cable 201 may be wound up again when one person comes in first. However, the charging time may also be set such that the charging can be restarted when every light is turned off state even if there is a user. In this manner, the charging time can be set by utilizing the peripheral IoT device which recognizes absence of the user.

The foregoing embodiment has illustrated the case where the charger 300 is disposed on the floor. However, in this case, a safety problem may occur. For example, children or pets may touch the charger 300 or the charge cable 201 or may be struck by an electric shock due to the power supply unit 350. To solve this problem, a manner that the charger 300 is installed on a ceiling W and the electronic frame 200 is installed on a wall surface may be considered in one embodiment according to the present invention, contrary to the manner that the charge cable 201 is drawn out from the electronic frame 200.

Figure 20:
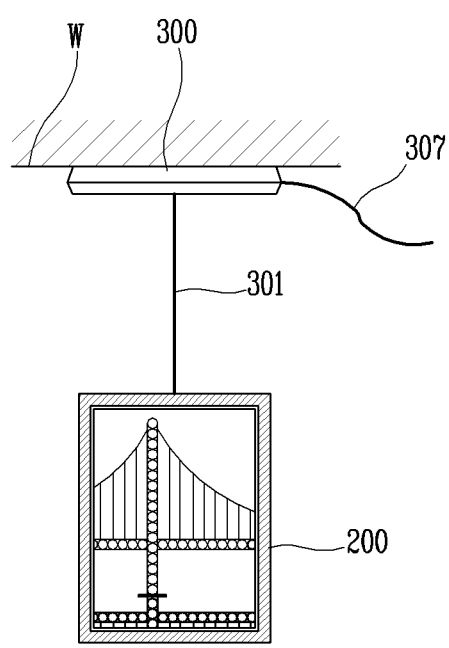
FIG. 20 is a view illustrating a charging assembly when a charger is hung from a ceiling according to one embodiment of the present invention.

FIG. 20 illustrates a charging assembly of an electronic frame when the charger is hung from the ceiling according to one embodiment of the present invention. Referring to FIG. 20, in the charging mode, a charge cable 301 is lowered to be brought into contact with the electronic frame 200, thereby charging the battery 220. At this time, the charging assembly includes the charger 300 installed on the ceiling W and having electrode portions 243 and 244, and the electronic frame 200 disposed below the charger 300 to display visual information through a display, and provided with a contact terminal 312 selectively brought into contact with the electrode portions.

The electrode portions correspond to the electrode portions 243 and 244 described above. When the electronic frame 200 is to be charged, the electrode portions are lowered through the charge cable 301 to be electrically connected to the contact terminal of the electronic frame 200 and thus the charging mode starts. The subsequent procedure may follow the procedure described in FIG. 11. That is, the battery may be charged by the processes described in FIG. 11 unless otherwise conflicted.

The foregoing description has mainly given of the case of charging the battery 220 by a power transmission method using a wire, but the present invention is not necessarily limited thereto. For example, though efficiency may be somewhat lowered, the battery 220 may be charged by a wireless power transmission method. In this case, the charger 300 should be provided with a wireless power transmitter, and the electronic frame 200 should also be provided with a wireless power transmitter.

However, since the user may be exposed to electromagnetic waves which may adversely affect the user's body, the charging in the wired manner is preferable.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

INDUSTRIAL APPLICABILITY

Embodiments of the present invention can be applied to an apparatus for automatically charging an electronic frame.

The invention claimed is:

1. A charging assembly, comprising:
an electronic frame having a battery and displaying visual information;
a take-up reel provided on a rear surface of the electronic frame to wind or unwind a charge cable;
a weight connected to the take-up reel by the charge cable to be raised and lowered; and
a charger arranged to be spaced apart from the electronic frame and charging the battery, wherein the weight is lowered during the charging of the battery to be electrically connected to the charger, wherein the electronic frame is configured to:
determine whether a capacity of the battery is less than a predetermined value;
detect a movement of an object around the electronic frame; and
couple an electrode portion provided on the electronic frame to the charger when the movement of the object around the electronic frame is not detected, and wherein the electronic frame detects an absence of the object by interworking with an Internet of Things (IoT) device.

2. The charging assembly of claim 1, wherein the electronic frame comprises:
a display unit to output the visual information;
a support frame supporting a display unit;
a motor provided on the support frame to rotate the take-up reel; and
a main circuit board to control the motor.

3. The charging assembly of claim 1, wherein the weight is formed to be streamlined downward, the charger is provided with an insertion groove to correspond to a shape of the weight, and the insertion groove is provided with an inclined guide formed at an inlet side thereof to be inclined downward to guide the weight.

4. The charging assembly of claim 3, wherein the weight is provided with the electrode portion, and the charger is provided with a contact terminal protruding into the insertion groove, having elasticity and selectively brought into contact with the electrode portion.

5. The charging assembly of claim 3, wherein a front end portion of the weight is formed in a conical shape.

6. The charging assembly of claim 3, wherein the weight is made of a metal material, and the charger is provided with a magnetic member on one side of the insertion groove to guide an insertion of the weight.

7. The charging assembly of claim 1, wherein the charger is provided with a cover having a hinge on one side thereof to be rotatable about the hinge so as to selectively cover a top surface of the charger.

8. The charging assembly of claim 1, wherein the weight has a disc shape, and the charger is mounted on a side wall, wherein the weight is coupled to the charger by magnetic force during the charging of the battery.

9. The charging assembly of claim 1, wherein a rail is formed from a power supply unit for supplying power to the charger to a point below each electronic frame when the electronic frame is provided in plurality, and the charger charges the electronic frames by moving along the rail.

10. The charging assembly of claim 9, wherein each of the electronic frames and the charger is provided with a wireless transceiver such that the charger detects a position of each of the electronic frames.

11. The charging assembly of claim 1, wherein when the electronic frame and the charger are each provided in plurality, chargers corresponding to the respective electronic frames are provided below the electronic frames, and the chargers are connected by one power cable.

12. The charging assembly of claim 11, wherein when the electronic frame is provided in plurality, one charger of the plurality of chargers is provided below the plurality of electronic frames, and the charger and the plurality of electronic frames are connected by respective charge cables.

13. The charging assembly of claim 12, wherein when the electronic frame is provided in plurality, the plurality of electronic frames are connected by connection cables, and one of the plurality of electronic frames is connected to the one charger by a charge cable.

14. The charging assembly of claim 1, wherein the charger is connected to a power supply unit by a power cable, and the charger and the power supply unit are selectively connected or disconnected by power supply connection portions.

15. A method for charging an electronic frame comprising the electronic frame having a battery, and a charger arranged to be spaced apart from the electronic frame and charging the electronic frame, wherein the electronic frame is provided with an electrode portion selectively coupled to the charger, the method performed by a controller of the electronic frame comprising:
(a) determining whether a capacity of the battery is less than a preset value;
(b) detecting a movement of an object around the electronic frame; and
(c) coupling the electrode portion provided on the electronic frame to the charger when the movement of the object around the electronic frame is not detected, and
wherein the detecting the movement of the object comprises detecting absence of a user by interworking with an Internet of Things (IoT) device.

16. The method of claim 15, wherein the step (a) further comprises determining through an illumination sensor whether brightness is equal to or lower than preset brightness.

17. The method of claim 15, wherein the step (b) comprises detecting a user through a motion detection sensor.

18. The method of claim 15, wherein the step (c) comprises detecting whether or not the electrode portion has been mounted to a correct position of the charger, and transmitting an error message to the user through a display when the electrode portion has not been mounted to the correct position.

19. A charging assembly, comprising:
a charger installed on a ceiling and having an electrode portion;
an electronic frame having a battery, disposed below the charger, displaying visual information through a display, and provided with a contact terminal selectively brought into contact with the electrode portion;
a take-up reel provided on a rear surface of the electronic frame to wind or unwind a charge cable; and
a weight connected to the take-up reel by the charge cable to be raised and lowered,
wherein the electrode portion is lowered by a charge cable to be electrically connected to the contact terminal when the electronic frame is charged,
wherein the weight is lowered during the charging of the battery to be electrically connected to the charger,
wherein the electronic frame is configured to:
determine whether a capacity of the battery is less than a predetermined value;
detect a movement of an object around the electronic frame; and
couple the electrode portion of the charger to the contact terminal of the electronic frame when the movement of the object around the electronic frame is not detected, and wherein the electronic frame detects absence of the object by interworking with an Internet of Things (IoT) device.

* * * * *